United States Patent [19]

Khoe

[11] Patent Number: 4,777,664
[45] Date of Patent: Oct. 11, 1988

[54] BROADBAND OPTICAL DISTRIBUTION SYSTEM

[75] Inventor: Giok D. Khoe, Eindhoven, Netherlands

[73] Assignee: U.S. Philips Corporation, New York, N.Y.

[21] Appl. No.: 905,813

[22] Filed: Sep. 9, 1986

[30] Foreign Application Priority Data

Sep. 30, 1985 [NL] Netherlands ............... 8502665

[51] Int. Cl.⁴ ............................ H04B 9/00
[52] U.S. Cl. ......................... 455/612; 455/607; 455/617; 370/3
[58] Field of Search ........... 455/607, 612, 617, 610; 370/1, 3

[56] References Cited

U.S. PATENT DOCUMENTS

| | | | |
|---|---|---|---|
| 4,210,803 | 7/1980 | Ih | 455/610 |
| 4,530,084 | 7/1985 | Strebel et al. | 455/607 |
| 4,601,027 | 7/1986 | Scarr et al. | 455/617 |
| 4,635,246 | 1/1987 | Taylor et al. | 455/617 |

OTHER PUBLICATIONS

Okoshi–Heterodyne and Coherent Optical Fiber Communications–IEEE Trans. on Microwave Theory & Techniques–vol. MT30, No. 8, Aug. 1982, pp. 1138–1149.

Primary Examiner—Robert L. Griffin
Assistant Examiner—Leslie Van Beek
Attorney, Agent, or Firm—Thomas A. Briody; Jack E. Haken; Anne E. Barschall

[57] ABSTRACT

Broadband optical distribution system for a local optical fibre network in which the heterodyne or homodyne principles are used. So as to utilize the wavelength range available for transmission to the best possible extent, highly stabilized auxiliary oscillators are included in the main exchange. On the request of a subscriber a given auxiliary frequency is transmitted to the subscriber. Said auxiliary oscillators can be utilized by several subscribers, the expenses resulting from the auxiliary oscillators being shared by several subscribers.

6 Claims, 2 Drawing Sheets ated with, for example, a digital 560M bit/s signal. In view of the

BROADBAND OPTICAL DISTRIBUTION SYSTEM

BACKGROUND OF THE INVENTION

1. Field of the Invention

The invention relates to a broadband optical distribution system for a local optical fibre network, comprising a main exchange which is connected to a plurality of subscriber's sites via optical fibres, the transmission system comprising at least one auxiliary oscillator for converting in the subscriber's site the optical transmission signal applied by the main exchange into a lower intermediate-frequency electrical signal. The contempory wavelength multiplex systems are examples of optical frequency-division multiplex systems in which the optical carriers are roughly separated relative to each other. Each of the carriers is modulated with, for example, a digital 560M bit/s signal. In view of the dimensions of the present transmission frames, which are located between 800–900 nm and 1300–1500 nm this implies that approximately 16 of such optical carriers are potentially available. The small spacings between two optical carriers are simply a waste of frequency range. A space of 25 nm between two optical carriers represent a frequency separation of 7500 GHz. All these empty spaces together represent a frequency range waste of 16×7500 GHz.

2. Description of the Prior Art

The above problem can be obviated by using a heterodyne optical transmission system such as the system described in, for example, IEEE Transactions M.T.T., vol. 30, no. 8, August 1982, pages 1138–1149. A heterodyne optical transmission system enables an optical frequency multiplexing, in which the spaces between the optical carriers can be kept small. A difficult factor in said heterodyne systems is the stability of the optical frequency of the laser diodes required therefor. In an optical heterodyne system the signal-carrying optical frequency $F_1$ is combined at the input of a photodiode with a local oscillation frequency $F_o$. The output current of the photo-diode then includes an intermediate-frequency carrier having a frequency of $(F_o-F_1)$ MHz.

So as to obtain reasonable variants for these intermediate frequency carriers, for example 1 GHz, it is imperative that both $F_1$ and $F_o$ are limited within, for example, 100 MHz. Given the fact that the frequency drift of a laser diode because of temperature fluctuations is approximately equal to 20 GHz/°C., this is very difficult to realise. If, for example, $F_1=300{,}000$ GHz this means that the temperature must be stabilised to 0.01° C. This implies that this temperature stabilisation must be realised in every subscriber's site, which means very high costs for each subscriber site.

SUMMARY OF THE INVENTION

The invention has for its object to provide a solution for the above-defined problem, and is characterized in that the auxiliary oscillator is included in the main exchange, at the same time switching means being incorporated in the main exchange and in the subscriber's sites for on the one hand requesting the stabilised auxiliary frequency by the subscriber's site and thereafter applying this stabilised auxiliary frequency to the said subscriber's sites.

Then the "local" oscillator frequency $F_o$ is distributed by the main exchange to the subscriber sites. The most effective manner to do so is the use of the remote control concept. A subscriber's site "requests" the main exchange to apply a predetermined, highly stabilised oscillator frequency $F_o$ to it, whereafter the main exchange transmits this frequency to the subscriber's site. The subscriber's site includes an optical detector and signal processing means for the modulated intermediate-frequency carrier ($F_o-F_1$).

The distribution system according to the invention has the important advantage that the sophisticated technology can now be concentrated in a professional location, namely the main exchange. This is definitely a better environment for realising highly stabilised optical frequencies than the subscriber's sites. A further advantage is that the cost required for realising the highly stabilised optical frequencies are borne by several subscriber's sites cooperating with the main exchange.

BRIEF DESCRIPTION OF THE DRAWINGS

The invention and how it can be put into effect will now be described in greater detail by way of example with reference to the accompanying drawing.

DETAILED DESCRIPTION OF THE PREFERRED EMBODIMENT

Figure 1:
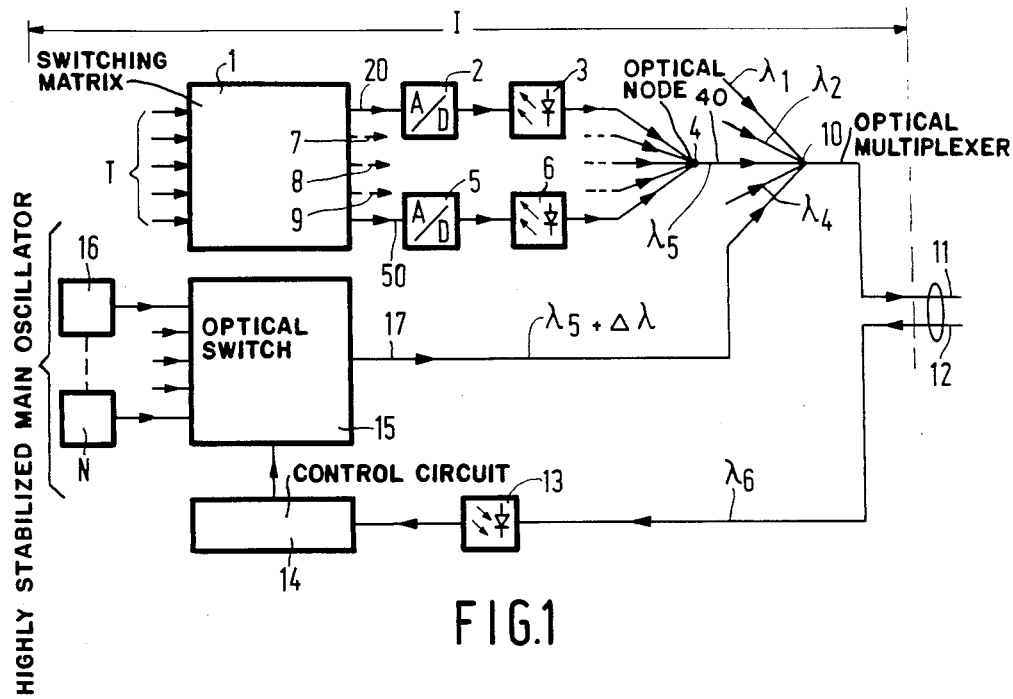
FIG. 1 shows an embodiment of a main exchange in the distribution system according to the invention.

In the main exchange I of FIG. 1, the 5 video signals T are transferred to the desired outputs 7, 8, 9, 20 and 50 via a matrix 1. The output 20 of the matrix 1 is connected to the input of the analog/digital converter 2, whose output is connected to the input of the electro-optical converter 3. The output of the electro-optical converter 3 is connected to an input of the optical node 4. The output 20 of the matrix 1 is connected in a similar way via an analog/digital converter and the electro-optical converter to an input of the optical node 4. Each of the outputs 7, 8 and 9 is also connected to an input of the node 4 via the series arrangement of an analog/digital converter (not shown) and an electro-optical converter (not shown). The output of the node 4 is connected to an input of the optical multiplexer 10. Each of the inputs of the optical switch 15 is connected to one of the highly stabilised main oscillators 16 . . . N. An output 17 of the optical switch 15 is connected to an input of the optical multiplexer 10. The output of the optical multiplexer 10 is connected to the optical fibre 11 for downstream wavelengths towards the subscriber's sites. The upstream wavelengths coming from the subscriber's site(s) are applied to the input of the opto-electrical converter 13 via the optical fibre. The output of the opto-electrical converter 13 is connected to the control circuit 14, whose output is connected to the control input of the optical switch 15.

Each of the analog television signals T is connected to one of the outputs 7, 8, 9, 20 or 50 via the switching matrix. The analog television signals present at said outputs are each converted via an analog/digital converter into a digital television signal. This conversion is effected because of the fact that, in contradistinction to analog modulation, a digitized television signal offers the best solution as regards the linearity of the noise problems. In addition, digitizing offers the possibilities of an improved picture quality and a lower sensitivity to noise. The digital television signals outgoing from the analog/digital converters 2 . . . 5 are converted by means of the electro-optical converters 3 . . . 6 into optical signals which are thereafter radiated into the optical fibre 40 via the optical node 4 (branching point). The digital television signals radiated to the fibre 40 are applied to an input of the optical multiplexer 10. It should be noted here that television signals occurring at the outputs 7, 8, 9, 20 and 50 are intermediate-frequency electrical signals shifted, for example, 1 GHz relative to each other. From the subscriber's site an optical auxiliary oscillator selection signal is received by the main exchange via the fibre 12. With the aid of the opto-electrical converter 13 this signal is converted into an electrical signal which is applied to the input of the control circuit 14. This control circuit 14 sets the optical switch 15 such that the optical auxiliary oscillator circuit requested by the subscriber occurs at the output 17 of the optical switch 15. This optical auxiliary oscillator signal having a wavelength $\lambda_5 + \Delta\lambda$ is applied to an input of the optical multiplexer 10. Optical signals having the respective wavelengths $\lambda_1$, $\lambda_2$ and $\lambda_4$ are applied to the other inputs of the multiplexer. Data can be modulated on these optical carriers for, for example, services such as telephone, digital sound, picture telephone. Customary values for the above-mentioned wavelengths are, for example:

| | |
|---|---|
| $\lambda_1$ = 1350 nm. | $\lambda_5$ = 1500 nm |
| $\lambda_2$ = 1400 nm | $\lambda_6$ = 800 nm |
| $\lambda_4$ = 1450 nm | |

Figure 2:
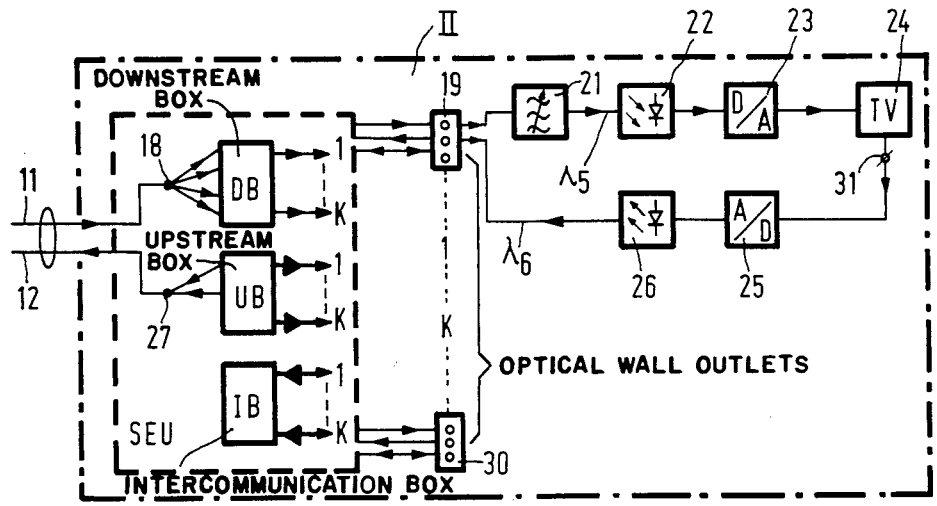
FIG. 2 shows an embodiment of a subscriber's site of the distribution system in accordance with the invention.

FIG. 2 includes a common terminal unit SEU (Subscriber Entrance Unit). The terminal unit SEU comprises a distribution box DB (downstream box), a distribution box (UD) (upstream box) and a distribution box IB (intercommunication box). The outputs 1 . . . K of the three distribution boxes DB, UB and IB are connected in known manner to the K optical wall outlets 19 . . . 30. This is described extensively in, for example, Netherlands Patent Application No. 8204722. The inputs of the distribution box DB are connected via the power splitter 18 to the optical fibre 11 for forward transmission signals (downstream). The outputs of distribution box UB are connected via the power splitter 27 to the optical fibre 12 for the return transmission signals (upstream). The optical wall outlets 19 . . . 30 are connected to the three distribution boxes DB, UB and IB in the manner disclosed in the Netherlands Patent application No. 8204722. The optical wall outlet 19 is connected via an optical band filter 21 to the input of the opto-electrical converter 22, whose output is connected to the input of the digital/analog converter 23. The output of the digital/analog converter 23 is connected to the television set 24. The selection output 31 of the television set 24 is connected via the analog/digital converter 25 to the input of the electro-optical converter 26 whose output is connected to the optical wall outlet 19.

Figure 3:
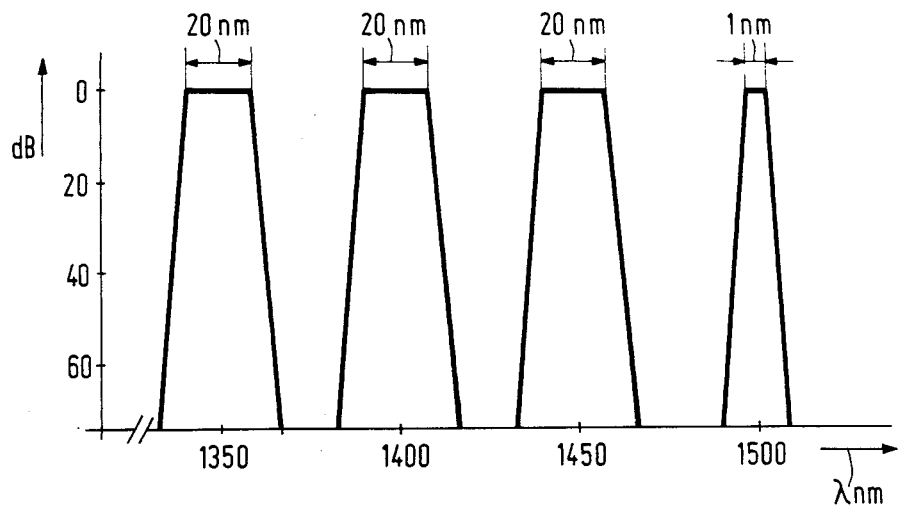
FIG. 3 shows a number of optical transmission curves to explain the invention.

Let it be assumed that a heterodyne wavelength band is arranged around the central wavelength of $\lambda_5$ = 1500 nm, see FIG. 3. In this heterodyne wavelength band the optical television signals incoming from the electro-optical converter 3 . . . 6 of the main exchange via the fibre 11 are accommodated. The relative distance between these television signals is, for example, 1 GHz, which corresponds to a $\Delta\lambda$ of 2.5 pm. The passband of the filter 21 is equal to 1 nm (see FIG. 3). This implies that in this narrow passband 4000 of these optical carrier signals can be accommodated. This has been made possible because all frequencies in this passband are now highly stabilised and defined. The non-heterodyne wavelength bands, such as shown in FIG. 3 for the wavelengths $\lambda_1$ = 1350 nm, $\lambda_2$ = 1400 nm and $\lambda_4$ = 1450 nm the customary bandwidths of approximately 20 nm must be maintained because of the frequency drift of the conventional optical carriers. With the aid of the optical band filter 21 in the subscriber's site II the heterodyne wavelength band around the wavelength $\lambda_5$ = 1500 nm is filtered from the forward transmission signals incoming from the main exchange. All these modulated optical carriers located in this passband and shifted 1 GHz relative to each other are applied together with an associated highly stabilised unmodulated carrier to the opto-electrical converter 22. The frequency of the unmodulated optical subcarrier is preferably located 1 GHz above the frequency of the modulated optical carrier of the highest frequency. Then intermediate-frequency electrical signals appear at the output of the opto-electrical converter 22 with frequencies equal to 1 GHz, 2 GHz . . . n.GHz, wherein n is equal to the number of modulated optical carriers. Using an electrical band filter (not shown) the desired intermediate frequency can be filtered from these intermediate-frequency signals. After digital/analog conversion in the digital/analog converter 23, the electric signal can be applied to the television set 24.

Instead of a mutual spacing of 1 GHz between the modulated optical carriers this spacing may alternatively be chosen greater, for example 10 GHz. If the subscriber opts for a given modulated optical carrier, then the main exchange co-transmits the associated stabilised unmodulated optical carrier to the subscriber's site. Three electrical signals are then produced at the output of the opto-electrical converter 22 in the subscriber's site II having the respective frequencies 1 GHz, 9.9 GHz and 19.9 GHz. The desired electrical intermediate-frequency signal of 1 GHz can be filtered therefrom using a simple low-pass filter, the signal being applied to the television set after digital/analog conversion.

The most efficient mode of operation is, for example, as follows. If no information is requested by one of the subscriber's sites, no optical frequencies are present in the narrow 1 nm heterodyne band. The first subscriber's site requesting information from the main exchange is supplied with a stabilised unmodulated carrier and a modulated carrier containing the desired information. If information must be transmitted to a second subscriber's site, this site first checks whether the desired information is already present in the first modulated carrier or can be added to the first modulated carrier, if its carrier capacity is not fully utilized. If the carrier capacity of the first modulated carrier has been fully utilized, the second subscriber's site requests the main exchange for a second modulated carrier which thus contains the desired information. The first and second modulated carriers are separated from each other in the electrical intermediate-frequency range.

Figure 4:
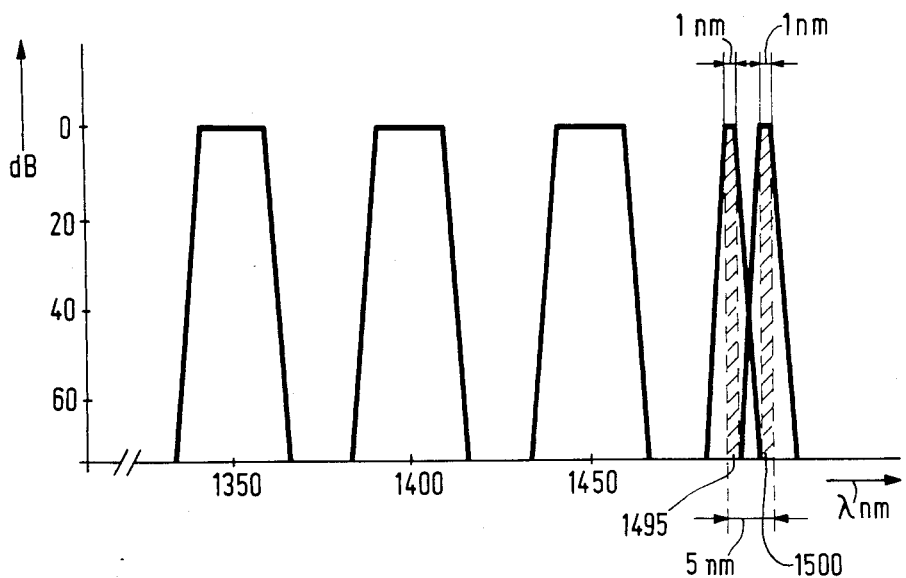
FIG. 4 shows a second number of optical transmission curves to explain the invention.

FIG. 4 illustrates the situation in which a second heterodyne band of 1 nm is used which contains, for example, information of a different service. Both heterodyne bands are fully separated from each other. In a subscriber's site one of the heterodyne bands is chosen, depending on the service required with the aid of a variable wavelength filter. The separation of the transmission curves of the heterodyne band can be kept very narrow because of the highly stabilised optical frequencies contained in the two heterodyne bands. Because of the fact that the contemporary wavelength filters are not wholly ideal, a spacing of 5 nm is recommendable between the two centre wavelengths of 1495 nm and 1500 nm. Since the broadband distribution system is, however, fully transparent, the spacing between said centre wavelength can be easily reduced, as soon as improved variable wavelength filters become available. The choice of the separation between the modulated optical carriers in the second heterodyne band around 1495 nm can be chosen independently of the separation between the modulated carriers such as they are contained in the first heterodyne band around 1500 nm. High-power lasers are preferablyused for the auxiliary oscillators 16 ... N, for example a gas laser. These lasers can, for example, be used for 4 or 5 subscribers, depending on the power.

What is claimed is:

1. A broadband optical distribution system for a local optical fibre network, comprising a main exchange for supplying an optical transmission signal to a plurality of subscriber sites, the distribution system comprising:
    a. a plurality of optical fibres for coupling with the subscriber sites;
    b. at least one auxiliary oscillator situated in the main exchange, which supplies a signal having a stabilised auxiliary frequency, so that the optical transmission signal comprises at least one modulated optical carrier and a stabilized auxiliary frequency; and
    c. subscriber switching means, situated within the subscriber sites, for transmitting requesting signals to the main exchange for requesting the stabilized auxiliary frequency, and
    d. main switching means, situated in the main exchange, for supplying, responsive to said requesting signals, the stabilized auxiliary frequency as part of the optical transmission signal to the subscriber sites, whereby the subscriber sites use the stabilized auxiliary frequency produced by the main exchange for converting the optical transmission signal into an intermediate signal having a lower frequency.

2. A broadband optical distribution system as claimed in claim 1, wherein the optical transmission signal comprises:
    a. a plurality of modulated optical carriers; and
    b. an unmodulated stabilised optical auxiliary carrier in a wavelength band of 1 nm, the frequency spacing between each pair of adjacent optical carriers being approximately 1 GHz.

3. A broadband optical distribution system as claimed in claim 2, wherein the optical transmission signal comprises, in a wavelength band of 1 nm a number of unmodulated stabilized optical carriers having frequencies which are shifted 10 GHz relative to each other, a modulated optical carrier being added to each one of said stabilised optical carriers, the modulated optical carrier having a frequency 1 GHz lower than each associated stabilized optical carrier.

4. A broadband optical distribution system as claimed in claim 1, wherein the optical transmission signal comprises, in a wavelength band of 1 nm a number of unmodulated stabilized optical carriers having frequencies which are shifted 10 GHz relative to each other, a modulated optical carrier being added to each one of said stabilised optical carriers, the modulated optical carrier having a frequency 1 GHz lower than each associated stabilized optical carrier.

5. The system of claim 1 comprising a subscriber site with no local means for generating an auxiliary frequency, the subscriber site comprising:
    a. a first power splitter coupled with a first optical fibre to receive therefrom the optical transmission signal as a forward signal from the main exchange;
    b. a second power splitter coupled with a second optical fibre to transmit thereon return optical transmission signals requesting the stabilized auxiliary frequency to the main exchange;
    c. a plurality of optical wall outlets;
    d. an upstream distribution box having a plurality of outputs for coupling to respective ones of the plurality of optical wall outlets and having inputs coupled to receive the optical transmission signal from the first power splitter;
    e. a downstream distribution box having a plurality of terminals for coupling with respective ones of the plurality of optical wall outlets, and having an output for providing the signals requesting the stabilized auxiliary frequency from the main exchange;
    f. an intercommunication distribution box having a plurality of terminals for coupling with respective ones of the plurality of optical wall outlets;
    g. an optical band filter for filtering a heterodyne band from the optical transmission signal, the optical band filter having an input at a respective one of the plurality of optical wall outlets and having an output;
    h. an opto-electrical converter having an input at the output of the optical band filter and having an output;
    i. a digital/analog converter having an input at the output of the opto-electrical converter and having an output for coupling to a television set;
    j. an analog/digital converter having an input for coupling with a selection input of the television set and having an output; and
    k. an electro-optical converter having an input at the output of the analog/digital converter and having an output at the respective optical wall outlet whereby the subscriber site uses the stabilized auxiliary frequency from the main exchange for heterodyning.

6. A broadband optical distribution system for a local optical fibre network, comprising a main exchange which is connected to a plurality of subscriber sites via optical fibres, the distribution system comprising at least one auxiliary oscillator for converting in the subscriber sites an optical transmission signal applied by the main exchange into a lower intermedate frequency electrical signal, wherein the improvement comprises that
    the auxiliary oscillator is included in the main exchange, and
    respective switching means are incorporated in the subscriber sites and in the main exchange for requesting a stabilised auxiliary frequency from the auxiliary oscillator by the subscriber sites and thereafter for applying this stabilised auxiliary frequency to said subscriber sites, respectively.

* * * * *